US010895337B2

(12) United States Patent
Jahnke

(10) Patent No.: US 10,895,337 B2
(45) Date of Patent: Jan. 19, 2021

(54) PIPE UNION ASSEMBLY

(71) Applicant: Premium Oilfield Technologies, LLC, Houston, TX (US)

(72) Inventor: Douglas Jahnke, Houston, TX (US)

(73) Assignee: PREMIUM OILFIELD TECHNOLOGIES, LLC, Houston, TX (US)

( * ) Notice: Subject to any disclaimer, the term of this patent is extended or adjusted under 35 U.S.C. 154(b) by 324 days.

(21) Appl. No.: 16/005,933

(22) Filed: Jun. 12, 2018

(65) Prior Publication Data

US 2018/0356015 A1   Dec. 13, 2018

Related U.S. Application Data

(60) Provisional application No. 62/518,839, filed on Jun. 13, 2017.

(51) Int. Cl.

| F16L 15/08 | (2006.01) |
| B25B 13/46 | (2006.01) |
| F16D 41/07 | (2006.01) |
| F16L 21/02 | (2006.01) |
| B25B 13/50 | (2006.01) |
| F16L 19/02 | (2006.01) |
| F16L 19/025 | (2006.01) |

(52) U.S. Cl.
CPC .............. *F16L 15/08* (2013.01); *B25B 13/46* (2013.01); *B25B 13/50* (2013.01); *B25B 13/5091* (2013.01); *F16D 41/07* (2013.01); *F16L 19/025* (2013.01); *F16L 19/0212* (2013.01); *F16L 21/02* (2013.01); *F16L 2201/00* (2013.01); *F16L 2201/20* (2013.01)

(58) Field of Classification Search
CPC .......... F16L 15/08; F16L 15/04; B25B 13/46; B25B 13/50
USPC ............................... 285/39, 89, 332.2, 332.3
See application file for complete search history.

(56) References Cited

U.S. PATENT DOCUMENTS

| RE23,586 E * | 11/1952 | Merriman .............. F16L 19/005 411/143 |
| 3,971,614 A * | 7/1976 | Paoli ..................... H01R 13/621 439/321 |
| 4,030,798 A * | 6/1977 | Paoli ..................... H01R 13/621 439/321 |

(Continued)

*Primary Examiner* — Aaron M Dunwoody
(74) *Attorney, Agent, or Firm* — Jackson Walker, LLP

(57) ABSTRACT

The present invention provides a pipe union that uses mechanical advantage from leverage between a locknut with circumferential torque openings coupled to a tubular first portion and a torque ring with torque slots coupled to a tubular second portion to tighten the union. The tightening can occur without the need of a hammer impact on lugs. Initial tightening can at least partially align longitudinally the radial holes with the radial slots. Final tightening can occur by rotating the torque openings relative to the torque slots using mechanical advantage. Optionally, the pipe union can provide for a ratcheting mechanism to turn the locknut on the tubular first portion to engage the tubular second portion and exert a preliminary torque on the union. The pipe union design also provides a self-energizing elastomeric seal or metal seal. Angles on load shoulders can assist in creating preloads on the union to seal the components.

15 Claims, 13 Drawing Sheets

(56) References Cited

U.S. PATENT DOCUMENTS

| | | | |
|---|---|---|---|
| 6,401,825 B1 * | 6/2002 | Woodrow | B63B 21/502 |
| | | | 166/350 |
| 9,397,441 B2 * | 7/2016 | Sun | H01R 13/622 |
| 9,528,646 B2 * | 12/2016 | Hyzin | F16L 19/005 |
| 9,666,973 B1 * | 5/2017 | Strahl | H01R 13/622 |
| 2014/0374122 A1 * | 12/2014 | Fanguy | E21B 21/02 |
| | | | 166/380 |
| 2018/0231155 A1 * | 8/2018 | Ellisor | F16L 15/08 |

\* cited by examiner

PIPE UNION ASSEMBLY

CROSS REFERENCE TO RELATED APPLICATIONS

This application claims benefit of U.S. Provisional Application Ser. No. 62/518,839, entitled "Hammerless Pipe Union", filed on Jun. 13, 2017 and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure relates generally to equipment used to connect pipes. More specifically, the disclosure relates to a coupling (union) that can use mechanical advantage to input torque on the union to tighten the connection.

Description of the Related Art

Conventional pipe couplings, such as unions, are used throughout most industries for connecting pipe, including tubing and other conduits. FIG. 1 is a typical known layout of a piping system with unions and other piping components. The piping system 2, such as a manifold, can include piping 4 coupled through a plurality of unions 8 with various piping components 6. Piping components can include valves, sensors, accumulators, and other components typically used in such systems. The unions provide the ability to remove and replace or repair piping components from the piping without disassembling large sections of the system. In addition to pipe end flanges that can be bolted together, two examples of unions include hammer unions and bolted hub clamps.

FIG. 2 is a partial cross-sectional view of a known hammer union. The hammer union 10 includes a tubular first portion 12 that can be sealingly engaged with a tubular second portion 14 at a sealing interface 16 therebetween. Engagement between the tubular first portion and tubular second portion can occur when a threaded lug 18 is longitudinally constrained by a ring 20 formed with a shoulder on the tubular first portion 12 and tightened around threads on the tubular second portion 14 at a threaded interface 21. Hammer unions are used when the ability to quickly change out a component in a system is desirable, or there is frequent disassembly of a system. Being a simple threaded nut design, the torque requirements are very high, necessitating the use of a heavy hammer to impact the lugs that are integral to the nut. Not only is the practice unsafe, there is little ability to determine that the required torque has been reached.

FIG. 3 is a partial cross-sectional view of a known hub clamp union. A hub clamp union 22 can be used for more permanent applications. The hub clamp union 22 can include a tubular first portion 24 and a tubular second portion 26 that can be joined together with a hub clamp 28. The tubular first portion 24 and tubular second portion 26 typically have tapered surfaces that interface with internal tapered surfaces of the hub clamp. The portions 24 and 26 are squeezed closer toward each other as the bolts on the hub clamp are tightened. The advantages are a smaller envelope, high bending capacity, fewer bolts, and bolting that is perpendicular to the pipe allowing connections to be close to one another or to other components. The disadvantages are high cost and the use of four bolts requiring a high torque. Assembly and disassembly is still time consuming, although less so than a flanged connection.

There remains a need for a pipe union that is relatively simple, rugged, and easy to install with minimum tools.

BRIEF SUMMARY OF THE INVENTION

The present invention generally provides a pipe union that uses mechanical advantage from leverage between a locknut with circumferential torque openings coupled to a tubular first portion and a torque ring with torque slots coupled to a tubular second portion to tighten the union. The tightening can occur without the need of a hammer impact on lugs. An initial tightening can at least partially align longitudinally the radial holes with the radial slots. Final tightening can occur by rotating the torque openings relative to the torque slots using mechanical advantage. Optionally, the pipe union can provide for a ratcheting mechanism to turn the locknut on the tubular first portion to engage the tubular second portion and exert a preliminary torque on the union. The pipe union design also provides a self-energizing elastomeric seal or metal seal. Angles on load shoulders can further assist in creating preloads on the union to seal the components.

A pipe union assembly, comprising: a tubular first portion having a bore; a tubular second portion having a bore and coupled with a torque ring, the torque ring having torque slots; and a locknut having an inner diameter greater than an outer diameter of the tubular first portion and configured to slide longitudinally over the tubular first portion, the locknut being longitudinally restrained in a direction toward the tubular second portion when the tubular second portion is facing the tubular first portion, the locknut being configured to engage the tubular second portion and rotate relative to the tubular second portion to pull the second portion closer to the first portion, the locknut having openings formed through at least a portion of the locknut, the openings being configured to align with the torque slots to allow a tool inserted into the opening to engage the torque slots and apply leverage to the locknut from the engagement to turn the locknut around the tubular second portion and pull the tubular second portion into sealing engagement with the tubular first portion.

A pipe union assembly, comprising: a tubular first portion having retaining segments circumferentially disposed around a periphery of the tubular first portion; a tubular second portion coupled with a torque ring, the torque ring being aligned transverse to a longitudinal axis of the tubular second portion and having torque slots aligned longitudinally, the tubular second portion having threads on a portion of the tubular second portion; and a locknut having an inner diameter greater than an outer diameter of the tubular first portion and configured to slide longitudinally over the tubular first portion, the locknut being longitudinally restrained by the retaining segments in a direction toward the tubular second portion when the tubular second portion is facing the tubular first portion, the locknut having mating threads configured to engage the tubular second portion threads and rotate relative to the tubular second portion to threadably pull the second portion closer to the first portion, the locknut having openings formed through a portion of the locknut radially outward from the torque slots, the openings being configured to align with the torque slots to allow a tool inserted into the opening to engage the torque slots and apply leverage to the locknut from the engagement to rotatably tighten the locknut around the tubular second portion and pull the tubular second portion into sealing engagement with the tubular first portion.

A method of tightening a pipe union having a tubular first portion, a locknut rotatably uncoupled and longitudinally coupled to the tubular first portion and having radial holes, and a tubular second portion having radial slots, comprising: engaging threads on the locknut with threads on the tubular second portion; rotating the locknut relative to the tubular second portion to partially tighten the tubular first portion with the tubular second portion and at least partially longitudinally align the radial holes with the radial slots; and further tightening the tubular first portion with the tubular second portion using mechanical advantage by rotating the radial holes relative to the radial slots.

BRIEF DESCRIPTION OF THE SEVERAL VIEWS OF THE DRAWINGS

The drawings filed herewith show examples of known unions and one or more embodiments of the new pipe union in various cross-sections and assembly views to illustrate the pipe union assembly and method of use.

DETAILED DESCRIPTION

Figure 1:
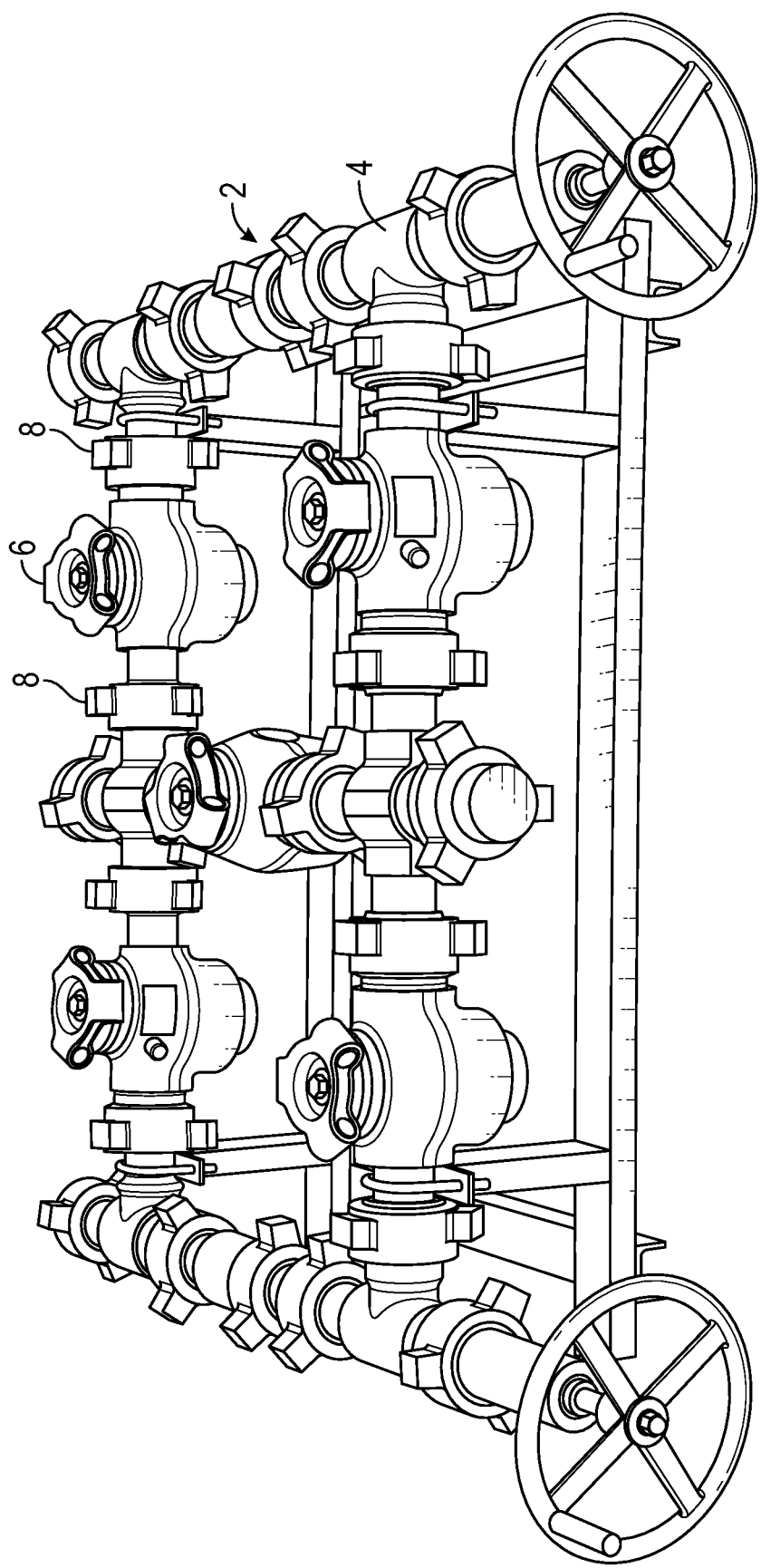
FIG. 1 is a schematic layout of a typical known piping system with unions and other piping components.
Figure 2:
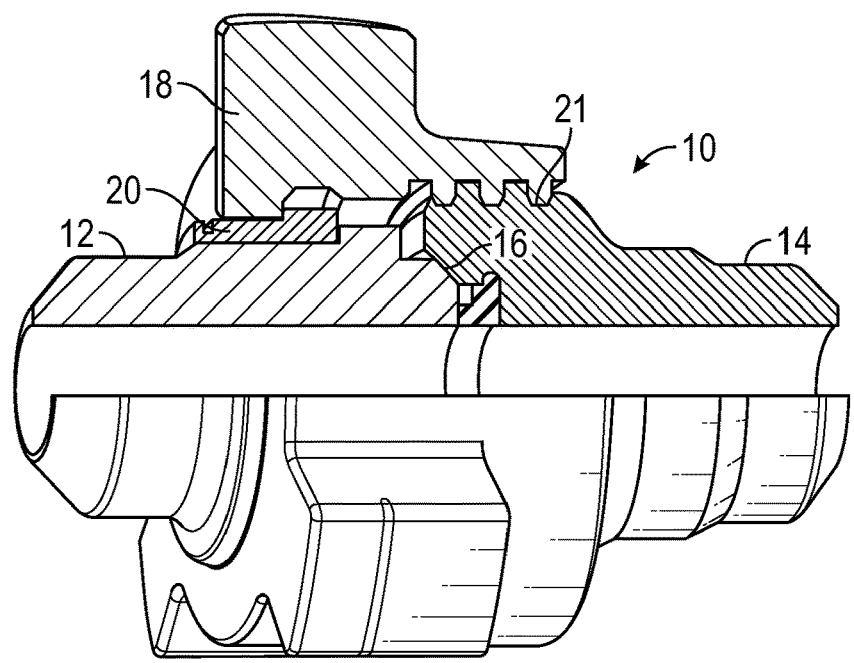
FIG. 2 is a partial cross-sectional view of a typical known hammer union.
Figure 3:
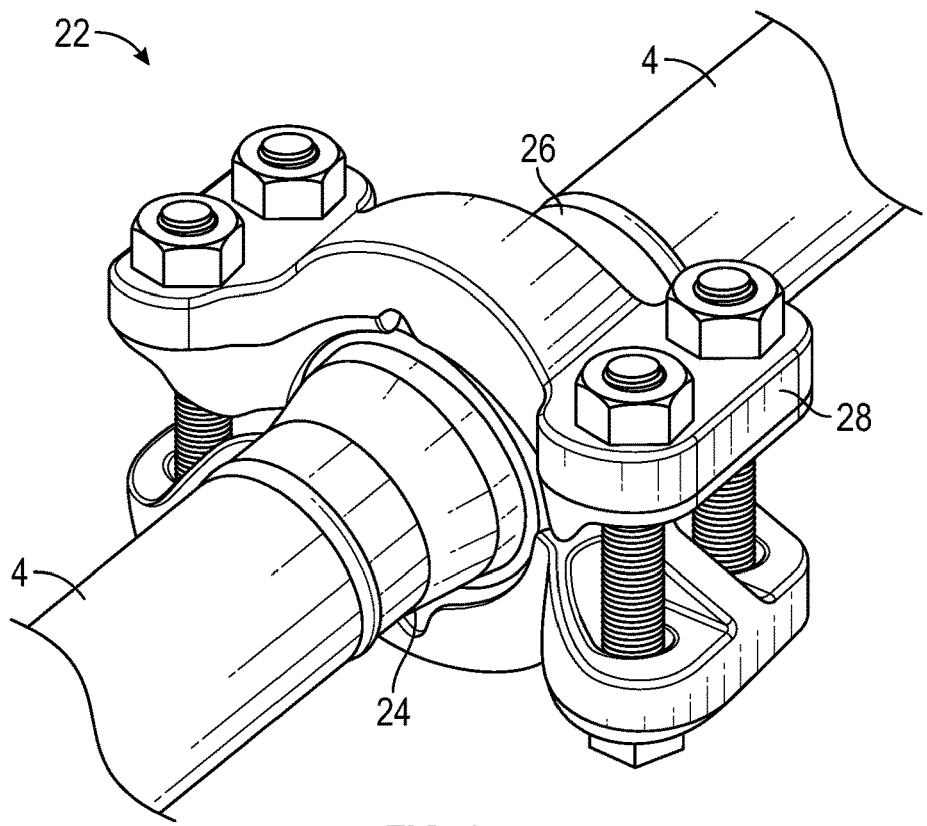
FIG. 3 is a partial cross-sectional view of a typical known hub clamp union.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a processor would encompass a processing system of related components that are known to those with ordinary skill in the art and may not be specifically described.

The present invention generally provides a pipe union that uses mechanical advantage from leverage between a locknut with circumferential torque openings coupled to a tubular first portion and a torque ring with torque slots coupled to a tubular second portion to tighten the union. The tightening can occur without the need of a hammer impact on lugs. An initial tightening can at least partially align longitudinally the radial holes with the radial slots. Final tightening can occur by rotating the torque openings relative to the torque slots using mechanical advantage. Optionally, the pipe union can provide for a ratcheting mechanism to turn the locknut on the tubular first portion to engage the tubular second portion and exert a preliminary torque on the union. The pipe union design also provides a self-energizing elastomeric seal or metal seal. Angles on load shoulders can further assist in creating preloads on the union to seal the components.

Figure 4:
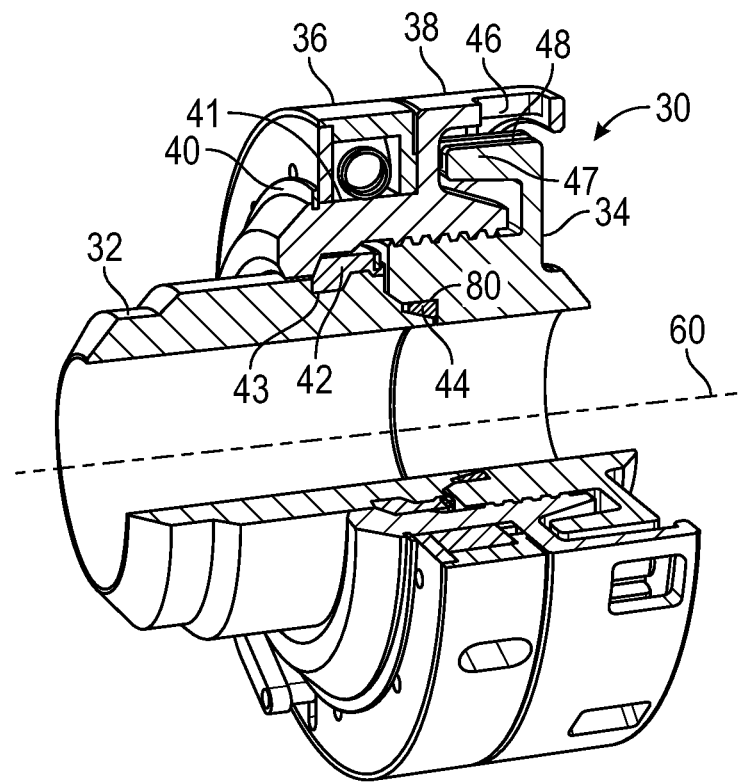
FIG. 4 is a schematic partial cross-sectional view of an example of a pipe union according to the present invention.
Figure 5:
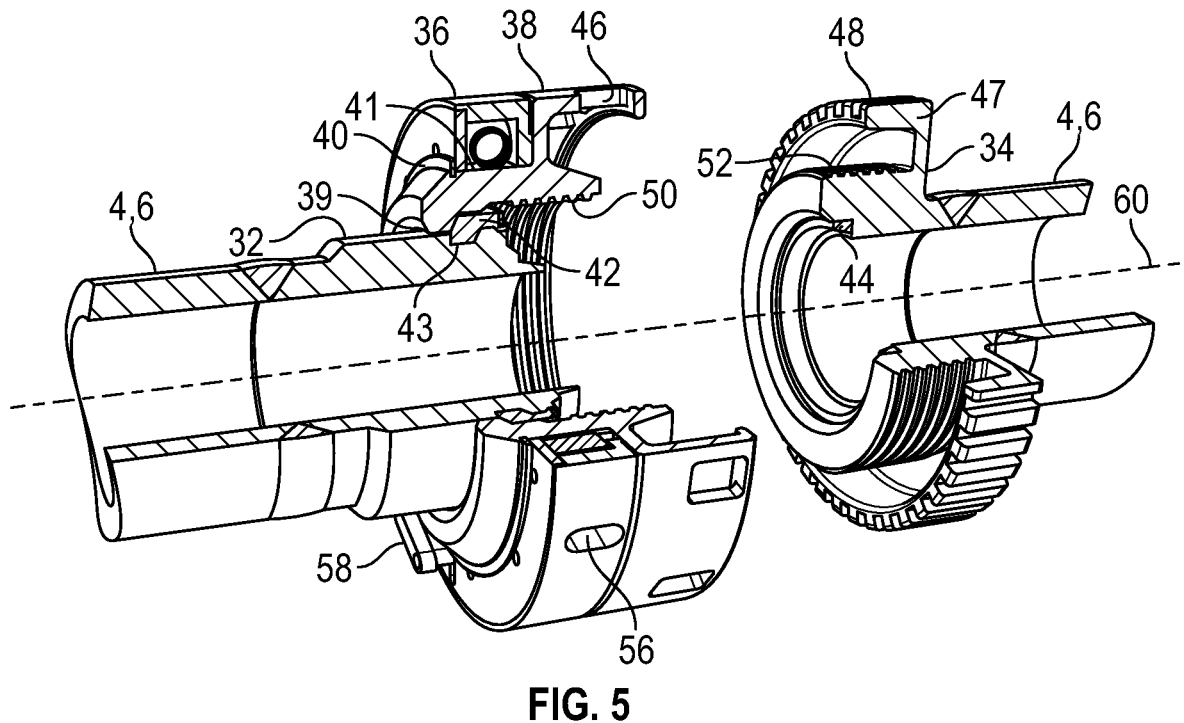
FIG. 5 is a schematic partial cross-sectional view of separated portions of the pipe union of FIG. 4.
Figure 6:
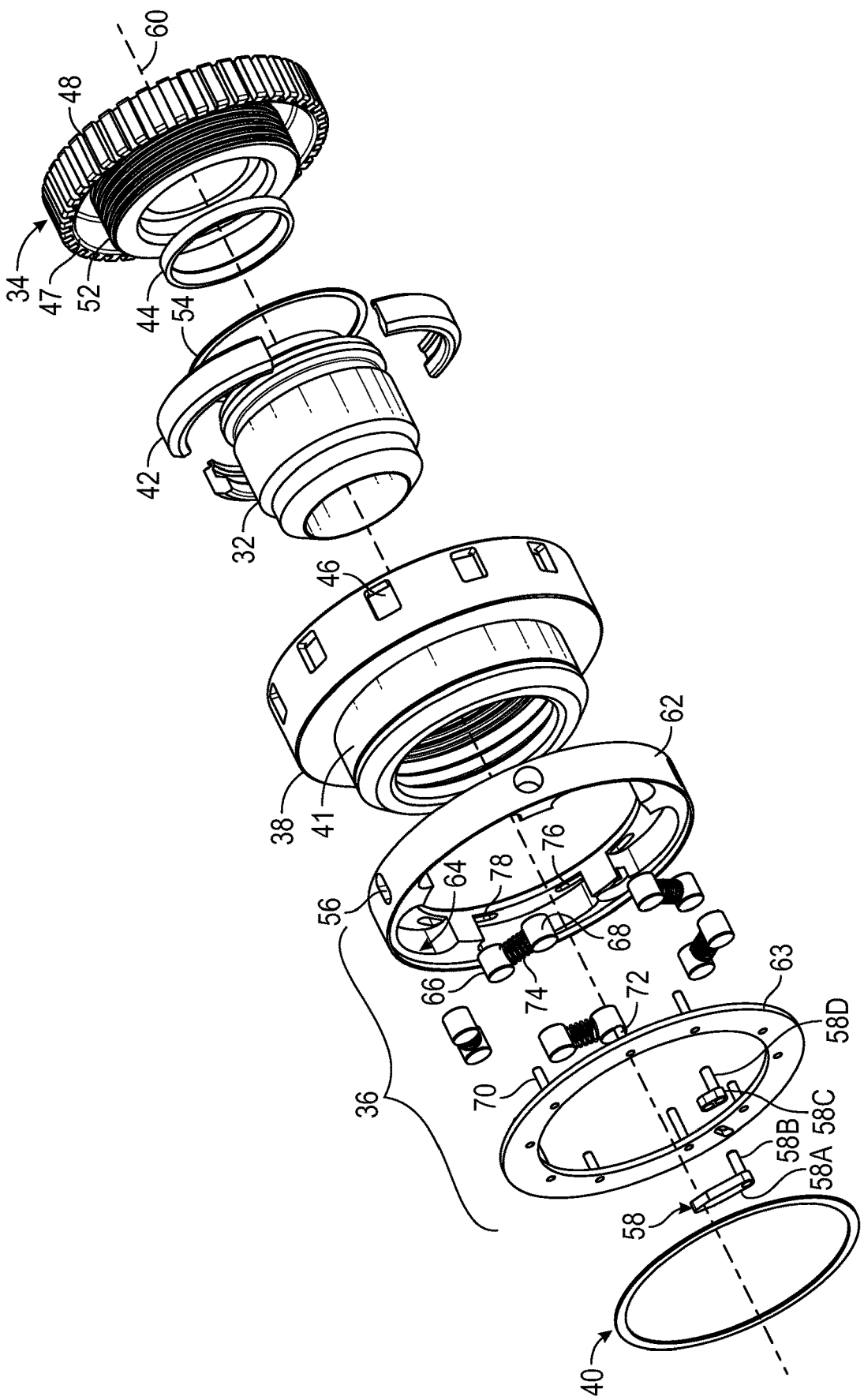
FIG. 6 is a schematic partial cross-sectional assembly view of components of the pipe union of FIG. 4.
Figure 7:
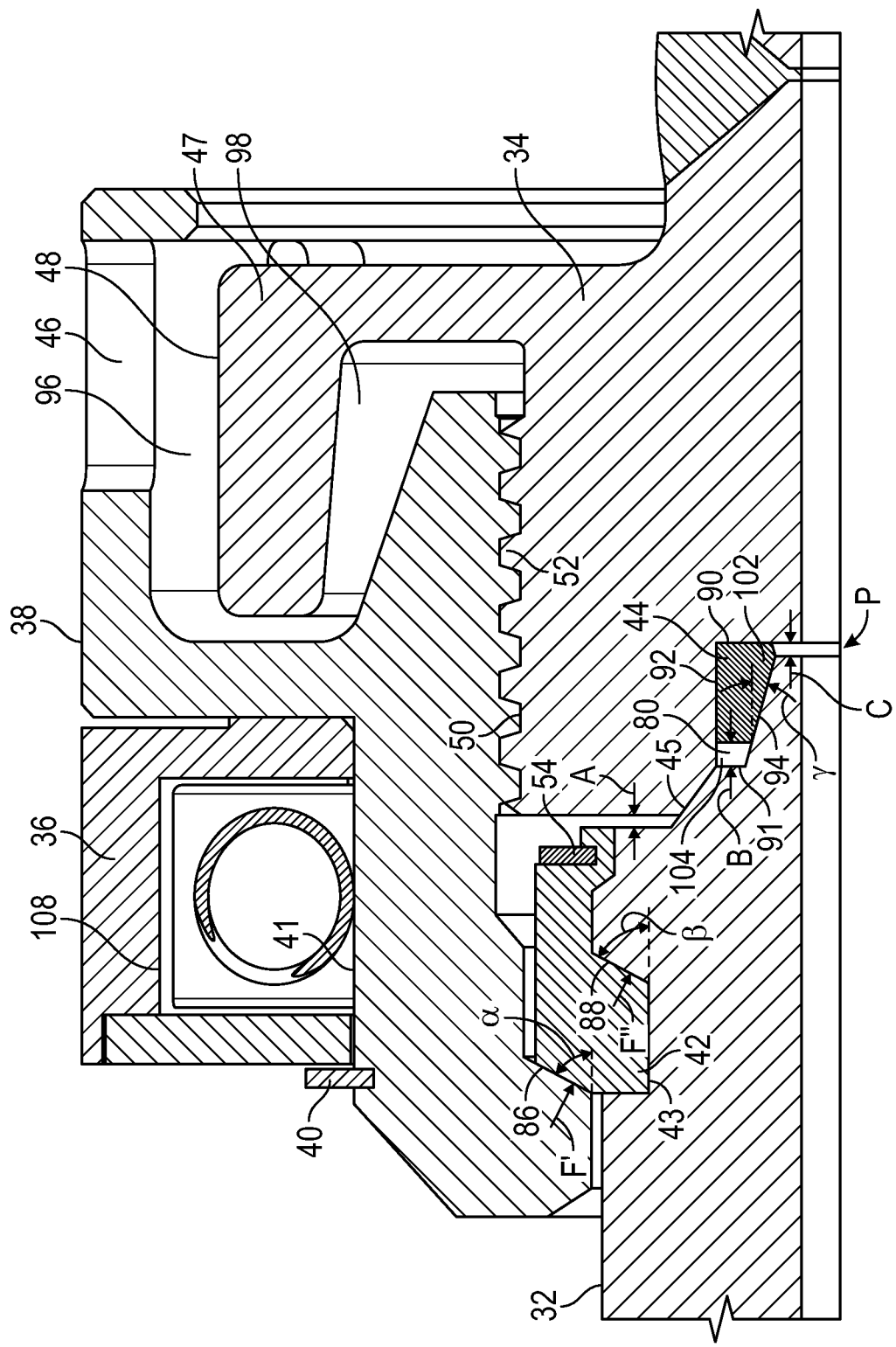
FIG. 7 is a schematic enlarged cross-sectional view of an interface between the tubular first portion and tubular second portion of the pipe union of FIG. 4.

FIG. 4 is a schematic partial cross-sectional view of an example of a pipe union according to the present invention. FIG. 5 is a schematic partial cross-sectional view of separated portions of the pipe union of FIG. 4. FIG. 6 is a schematic partial cross-sectional assembly view of components of the pipe union of FIG. 4. FIG. 7 is a schematic enlarged cross-sectional view of a portion of pipe union of FIG. 4.

A pipe union 30 can include a tubular first portion 32 and a tubular second portion 34. The pipe union can be "hammerless", where the term "hammerless" is intended to mean that the normal torque needs of a given application using a union can be met without necessitating the use of a hammer on lugs formed on the union. In the example illustrated in FIG. 4, the tubular first portion 32 can form a male connection and the tubular second portion 34 can form a female connection at their interface. A locknut 38 can be rotatably coupled around the tubular first portion 32 and threadably engaged with the tubular second portion 34 to pull and hold the two ends together along a longitudinal axis 60. A ratcheting ring 36, described in further detail below, can be selectively coupled around a locknut mounting surface 41 of the locknut 38 and longitudinally held to the locknut with a retaining ring 40. The ratcheting ring 36 can have one or more ratcheting ring openings 56 to help facilitate rotating the ratcheting ring reciprocally around the locknut 38 on the tubular first portion 32 to threadably couple the locknut with the tubular second portion 34. Distally from the union coupling, the tubular first portion 32 and tubular second portion 34 can be coupled to respective sections of piping 4 and/or piping components.

The locknut 38 can have a central bore 39 sized to slide over an outer portion of the tubular first portion 32. The locknut can further have helical threads 50 that can progressively engage corresponding threads 52 on the tubular second portion 34. The threads 50 of the locknut and threads 52 of the tubular second portion are used to couple the two ends 32 and 34 together and sealingly engage therebetween. The locknut 38 further includes torque openings 46 formed in an exterior surface of the locknut. The torque openings 46 in the locknut allow access through the locknut to torque slots 48 formed in a torque ring 47 of the tubular second portion 34, when the locknut and tubular second portion are at least partially coupled together to align the locknut torque openings 46 with the ring torque slots 48. In the embodiment example shown in the figures with details in FIG. 7, an annular space 96 is formed between the locknut portion having the threads 50 and the locknut portion having the torque openings 46 to allow room for the torque ring 47 with the torque slots 48 on the tubular second portion 34 when the tubular second portion is coupled with the locknut 38. Similarly, an annular space 98 is formed between the tubular second portion having the threads 52 and the torque ring 47 having the torque slots 48 to allow room for the locknut portion with the threads 50 when the locknut is coupled with the tubular second portion, as shown in FIG. 7.

The longitudinal movement of the locknut 38 can be restrained on the tubular first portion 32 toward the tubular second portion by one or more retaining segments 42 having an outer diameter larger than the bore 39 and disposed in a peripheral groove 43 that is formed in the tubular first portion 32, shown in more detail in FIG. 7. The separate segments 42 facilitate assembly around the tubular first portion to engage the groove 43 and then a retaining ring 54 can be placed around the segments to maintain their position in the groove. When the locknut 38 is longitudinally restrained by the segments 42, a compression force F' is created by the locknut on the segments at a locknut-segment interface 86 having an angle "α" that can range between 1° to 90° (and any increment therebetween or portion thereof) relative to the longitudinal axis 60 of the union 30. Consequently, the compression force F' on the segments creates a compression force F" from the segments to the tubular first portion at a segment-tubular first portion interface 88 having an angle "β" that can range between 1° to 90° (and any increment therebetween or portion thereof) relative to the longitudinal axis 60. By advantageously selecting the angles of the interface, the compression loads can be directed into the structure of the tubular first portion 32. As an example and without limitation given the relative proportions illustrated in FIG. 7, an advantageous value for angles α and β could be about 70° plus or minus 10°.

A self-energizing seal 44 can be disposed in a seal cavity 80 formed between the tubular first portion 32 and the tubular second portion 34. The seal cavity 80 can be formed by a shoulder 90 in the tubular second portion 34 and a shoulder 91 formed in the tubular first portion 32 disposed across the cavity from the shoulder 90 and bounded by a cavity outer peripheral surface 92 formed in the tubular second portion and a cavity inner peripheral tapered surface 94 formed in the tubular first portion 32. The taper angle "γ" can range between 1° to 90° (and any increment therebetween or portion thereof) relative to the longitudinal axis 60. Clearance A is near the segments 42 between the tubular first portion 32 and tubular second portion 34 radially outward from the seal 44, clearance B is between the tubular first portion shoulder 91 and the seal 44, and clearance C is between the tubular first portion and the tubular second portion radially inward from the seal to provide space for the union 30 to be tightened to a sufficient amount. When the two ends are progressively tightened closer to each other, the seal is pressed into a decreasing volume of the cavity 80 due to the tapered surface 94 and into sealing contact within the cavity between the first and tubular second portions. A relatively small amount of displacement of the seal in the cavity can create an initial compression force on the seal that is sufficient for at least low pressure. Because the clearance C provides a flow path to the seal cavity 80, the system pressure P in the bore of the union 30 can enter the cavity 80 at the large cross section 102 and further displace the seal toward the small cross-section 104 of the cavity to energize the seal with the system pressure. Thus, the seal is self-energizing and does not need to be coupled with enough initial compression to withstand a full system pressure, thereby simplifying the installation of the union.

Furthermore, a sealing interface 45 can be formed between the tubular first portion 32 and the tubular second portion 34 to seal surfaces therebetween. The sealing interface 45 can be a metal-to-metal interface that forms a sealing engagement when the tubular first portion 32 and tubular second portion 34 are sufficiently pulled together by the locknut 38.

As referenced above, the segments 42 restrain the longitudinal movement of the locknut 38 on the tubular first portion 32 in the direction of the tubular second portion 34. Thus, the tubular second portion 34 can be coupled with the tubular first portion 32 by rotating the locknut around the tubular first portion and engaging the locknut threads 50 with tubular second portion threads 52. Further rotation of the locknut 38 continues to pull the tubular second portion toward the tubular first portion to more fully couple the ends together. The ends 32 and 34 can be tightened together by rotating the ratcheting ring 36, such as with a tightening tool engaged into a ratcheting ring opening 56 to turn the ring. The first and tubular second portions can be even further tightened together by rotating the locknut 38 with a tightening tool inserted through the locknut torque openings 46 and engaging the ring torque slots 48 on the tubular second portion with the tool. Movement of the tool in this engagement creates a mechanical advantage of applied torque on the locknut to further rotate the locknut to create a desired amount of compression force on the seal 44 or the seal interface 45 or both.

The ratcheting ring 36 includes a ratcheting ring housing 62 formed with one or more ratcheting ring housing cavities 64. The housing cavities 64 can contain components for the clutching function, such as rollers 66 and bias elements 74. The ratcheting ring housing 62 can matingly engage a keeper plate 63. The keeper plate 63 can include a plurality of sets of retaining pins 70 and 72 around the keeper plate periphery that can matingly engage slots 76 and 78 formed in the ratcheting ring housing cavities 64 of the ratcheting ring housing 62, as described herein.

Ratcheting is accomplished in at least one embodiment by the ratcheting ring configured to operate as a one-way friction clutch that can selectively rotate circumferentially around the locknut in one direction and not in the opposite direction. The clutch allows the ratcheting ring to "freewheel" around the locknut in the one direction, and engage and rotate the locknut in the opposition direction. The clutch function can be reversible by rotating a ratcheting ring switch 58 that can engage the keeper plate 63 to shift the circumferential alignment of the keeper plate relative to the ratcheting ring housing 62. The switch 58 can include a lever 58A that can be fixedly coupled to a pin 58B that can pass through a slot formed through the keeper plate 63. Distally from the lever 58A, the pin 58B can be fixedly coupled to an actuator 58C that can engage a slot formed in the ratcheting ring housing 62. The actuator 58C can be fixedly coupled to an anchor pin 58D that can be rotatably coupled in an opening formed in the ratcheting ring housing 62. As the switch 58 is rotated by an operator between first and second positions, the lever 58A rotates the pin 58B, actuator 58C, and anchor pin 58D. The actuator 58C engages surfaces of the slot formed in the ratcheting ring housing for the actuator and moves the keeper plate rotationally relative to the ratcheting ring housing generally either clockwise or counterclockwise. Changing the circumferential position of the keeper plate relative to the ratcheting ring housing changes the position of the retaining pins 70, 72 on the keeper plate 63 relative to the respective slots 76 and 78 in the ratcheting ring housing 62. Changing the relative position of the retaining pins 70 and 72 relative to the respective slots 76 and 78 changes the position of the biased rollers 68 in the cavities 64 of the ratcheting ring housing 62 to clutch in generally either a clockwise or counterclockwise direction. Details and the functioning are described in references to FIGS. 8-10.

Figure 8:
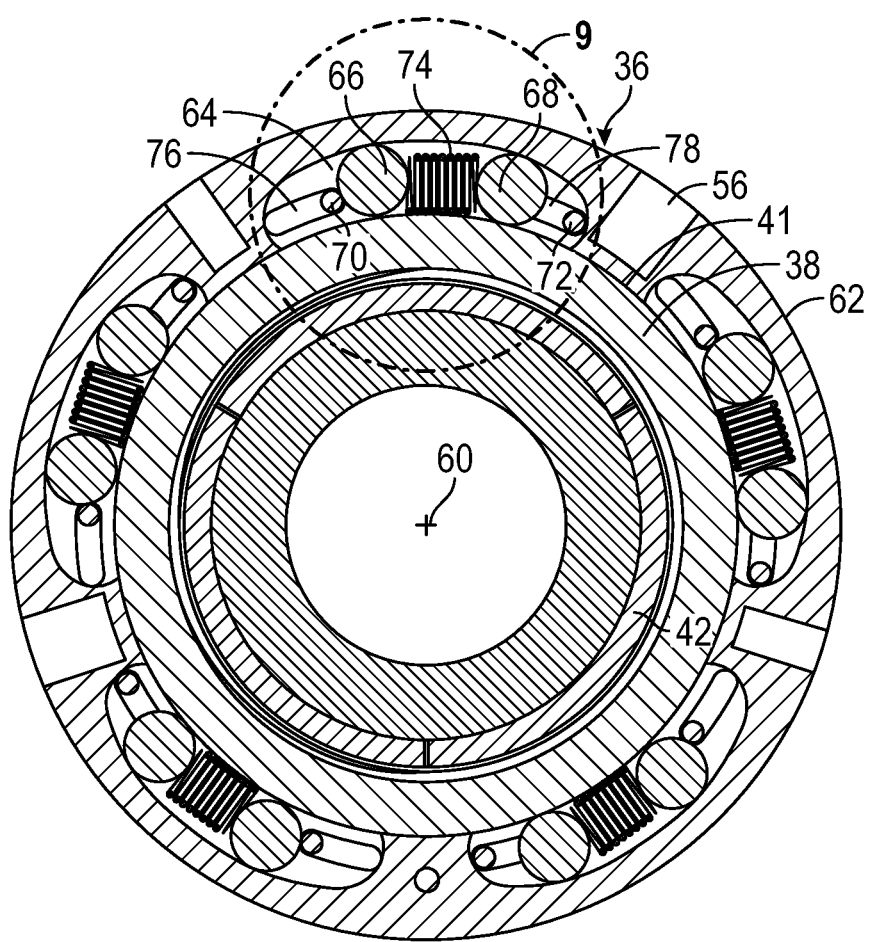
FIG. 8 is a schematic cross-sectional lateral view of a ratcheting ring and locknut on the tubular first portion of the pipe union of FIG. 4.
Figure 9:
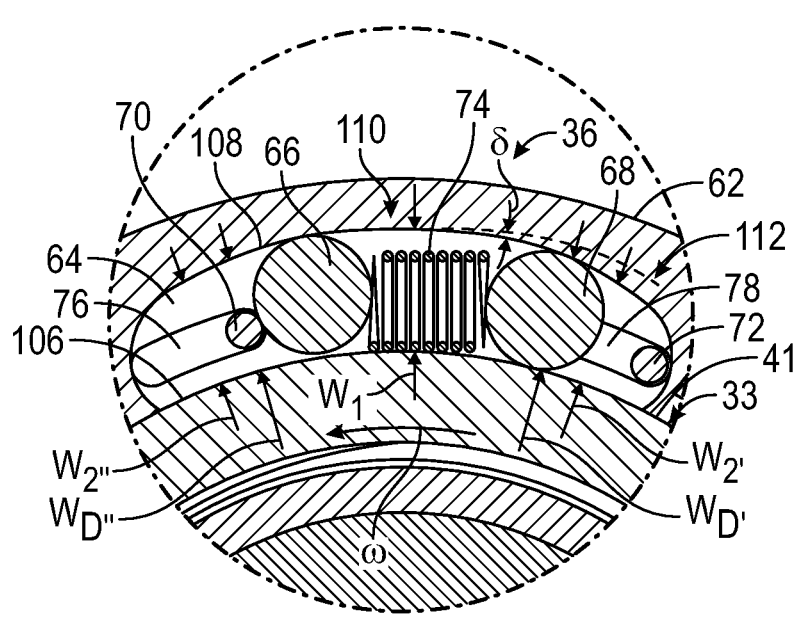
FIG. 9 is a schematic enlarged cross-sectional lateral view of the ratcheting ring and locknut of FIG. 8.
Figure 10:
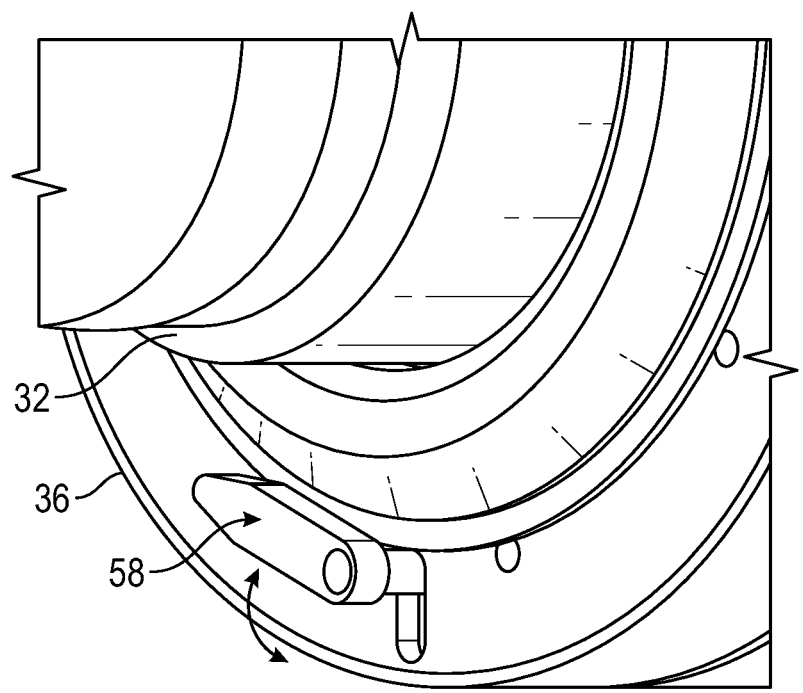
FIG. 10 is a schematic perspective view of a ratcheting ring switch of the ratcheting ring of FIG. 7.

FIG. 8 is a schematic cross-sectional lateral view of a ratcheting ring of the pipe union of FIG. 4. FIG. 9 is a schematic enlarged cross-sectional lateral view of a portion of ratcheting ring of FIG. 7. FIG. 10 is a schematic perspective view of a ratcheting ring switch of the ratcheting ring of FIG. 7. The ratcheting ring 36, as mentioned above, is retained on the locknut 38. The ratcheting ring includes a ratcheting ring housing 62 formed with one or more ratcheting ring housing cavities 64. The housing cavities 64 can contain components such as rollers, springs, and retaining pins disposed in slots, as described herein. Ratcheting is accomplished by the ratcheting ring configured to operate as a one-way friction clutch. The clutch function allows the ratcheting ring with the locknut to rotate in one direction in a relatively free wheeling mode as rotatably uncoupled from the locknut. However, when a torque is applied in the opposite direction, the clutch is no longer able to free wheel in motion and therefore resists rotation of the locknut in that direction as rotatably coupled with the locknut and can rotate the locknut. The ratcheting ring 36 can reciprocally release and grip the locknut 38 as the locknut is rotated around the tubular first portion 32 to be coupled with the tubular second portion 34 with the threads 50 and 52, respectively. The ratcheting ring 36 can be locked onto the surface of the locknut, the tightening tool can rotate the ratcheting ring and thereby rotate the locknut circumferentially through an arc, then the tightening tool can be rotated in an opposite freewheeling direction in which the ratcheting ring releases its grip on the locknut surface, and then the tightening tool can be rotated in the first direction that causes the tightening tool to reengage and grip the locknut surface to cause the locknut to again rotate when the ratcheting ring is rotated. The progressive back and forth motion of the tightening tool in the ratcheting ring can progressively tighten the locknut around the tubular second portion with the threads 50 and 52. When reversed, the progressive back and forth motion of the tightening tool in the ratcheting ring can progressively loosen the locknut around the tubular second portion and disengage the locknut from the tubular second portion.

In the embodiment shown, the housing cavity 64 can be formed with a slot 76 and a slot 78. The slots 76 and 78 can be tangential slots formed around the axis 60. A retaining pin 70 can be slidably disposed in the slot 76 and can move along the slot 76. A retaining pin 72 can be slidably disposed in the slot 78 and can move along the slot 78. A roller 66 can disposed in the housing cavity 64 adjacent the retaining pin 70. A roller 68 can also be disposed in the housing cavity 64 adjacent the retaining pin 72. A bias element 74, such as a spring, can be disposed in the housing cavity between the rollers 66 and 68. The housing cavity 64 can be formed with a generally arcuate inner wall 106 and a generally arcuate outer wall 108. The inner wall 106 can be formed from an outer periphery of the locknut mounting surface 41 of the locknut 38. Further, a tapered angle "δ" can be superimposed on the outer wall 108, so that the radial width W1 across the cavity 64 is greater in the tangential center portion 110 of the housing cavity 64 than a radial width W2' or radial width W2" (generally "W2") across a tangential end portion 112 of the cavity. The tapered angle δ can be from 1° to 30° (and any increment therebetween or portion thereof). The radial width W1 can be greater than the diameter of the rollers 66 or 68. The radial width W2 can be less than the diameter of the rollers 66 or 68. The rollers can selectively be allowed to selectively engage a surface on each of the inner wall 106 and the outer wall 108 where the radial width WD' or WD" (generally WD) that is dimensionally between radial widths W1 and W2 is the same as or slightly smaller than the diameter of the roller. The roller becomes wedged between the inner and outer surfaces 106 and 108 and can cease rotating and lock the ratcheting ring 36 to the locknut 38.

The clutch function can be reversible by rotating a ratcheting ring switch 58 coupled to a keeper plate 63 (shown in FIG. 6) that shifts the tangential position of the retaining pins 70 and 72 in their respective slots 66 and 68. When the switch 58 is shifted in one direction, such as illustrated in FIGS. 8 and 9, the retaining pin 70 is positioned in its slot 66 that restricts the amount of tangential movement of the roller 66 to keep the roller more toward the center portion 110 of the housing cavity 64 with the larger radial width W1, while the retaining pin 72 is shifted in its slot 68 to allow the roller 68 to be biased by the bias element 74 toward the end portion 112 with the smaller radial width W2'. When the ratcheting ring 36 is rotated in the direction "w" in FIG. 9, the roller 66 by being restricted from being displaced toward the smaller radial width W2" is relatively free to rotate in the greater radial width W1 and the roller 68 is allowed to rotate even though biased toward the smaller radial width W2'. The rotation in the direction w is constantly pulling the roller 68 away from the smaller width W2' to force the roller into a sufficient width to allow rotation. If the ratcheting ring 36 attempts to rotate in the opposite direction of direction w, the roller 68 is no longer pulled away from the smaller radial width W2'. The roller 68 is allowed to engage and become wedged toward the smaller radial width W2' at radial width WD' between the inner wall 106 and the outer wall 108, causing the roller 68 to cease rotating and locking the ratcheting ring from further rotation in such opposite direction. Increasing torque on the ratcheting ring to rotate in such opposite direction forces the roller into tighter contact with the inner and outer walls, causing further resistance to rotation of the ratcheting ring in such opposite direction. Thus, the clutch function of the ratcheting ring 36 allows rotation of the locknut 38 relative to the ratcheting ring in one direction but not the opposite direction.

When the opposite direction is desired for freewheeling, the switch can be rotated to a second position so that the retaining pin 70 can move in its slot 76 to disengage with the roller 66 and allow the roller 66 by the bias element 74 to be biased toward the smaller width W2", and the retaining pin 72 can move in its slot 78 to restrict the amount of tangential movement of the roller 68 to keep the roller 68 more toward the center portion 110. The ratcheting ring 36 can relatively freely rotate in such opposite direction, because the roller 68 is restricted from moving in the slot 78 toward the smaller radial width W2' that would otherwise wedge the roller and lock up the rotation. The rotation in such opposition direction is constantly pulling the roller 66 away from the smaller radial width W2" to force the roller into a sufficient width greater than radial width WD" to allow rotation. If the ratcheting ring 36 attempts to rotate in the direction w, the roller 66 is no longer pulled away from the smaller width W2". The roller 66 is allowed to engage and become wedged toward the smaller radial width W2" at radial width WD" between the inner wall 106 and the outer wall 108, causing the roller 66 to cease rotating and locking the ratcheting ring from further rotation in that direction.

Figure 11:
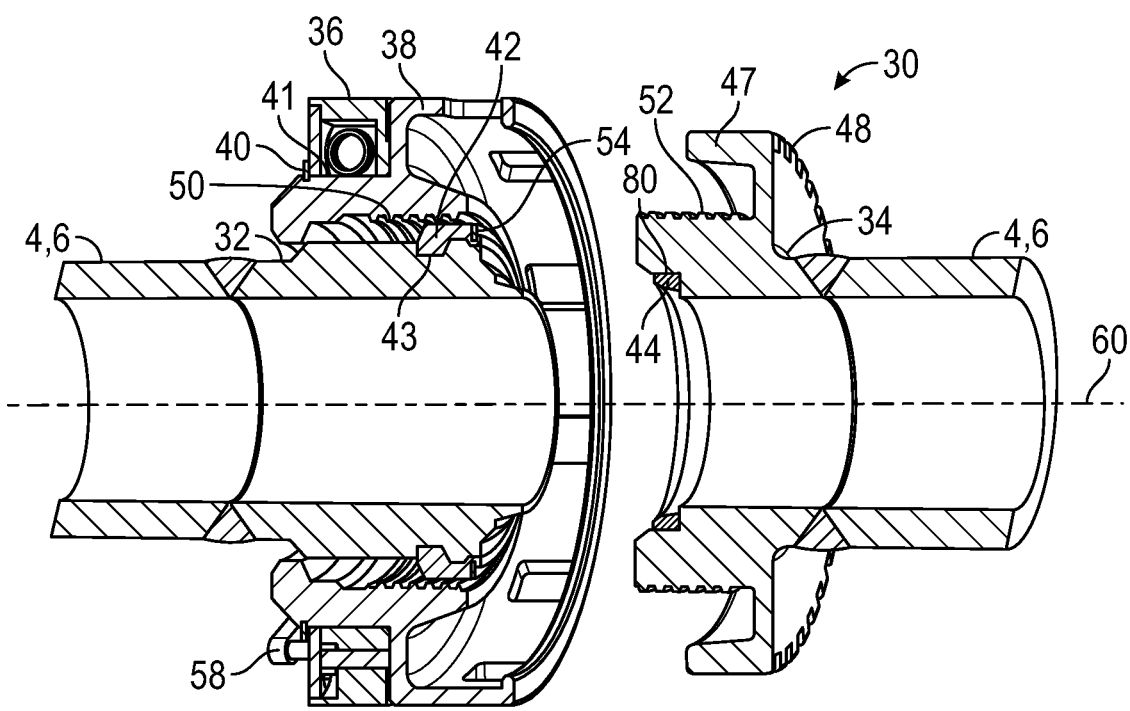
FIG. 11 is a schematic cross-sectional view of separated portions of the pipe union of FIG. 4 ready for coupling together.

FIGS. 11 through 17 illustrate an example of assembling and tightening the components of the above embodiment of the ratcheting pipe union 30. FIG. 11 is a schematic cross-sectional view of separated portions of the pipe union of FIG. 4 ready for coupling together. The tubular first portion 32 can be assembled with the retaining segments 42 assembled in the groove 43 and coupled together with the retaining ring 54. The ratcheting ring 36 can be assembled onto the locknut mounting surface 41 of the locknut 38 and restrained in position by the retaining ring 40. The locknut 38 with the ratcheting ring 38 can be slid onto the tubular first portion 32 for coupling with the tubular second portion 34. In some installations, such as when the tubular first portion is already coupled to piping 4 and/or components 6, the locknut 38 could be slid over the tubular first portion prior to mounting the segments 42 in the groove 43. In such an insulation, the locknut could be slid first over the tubular first portion past the groove 43 to allow the segments to be inserted in the groove, and then slid back toward the segments to engage the tubular second portion 34. The tubular second portion can be disposed in proximity to the tubular first portion with the seal 44 inserted into the seal cavity 80.

Figure 12:
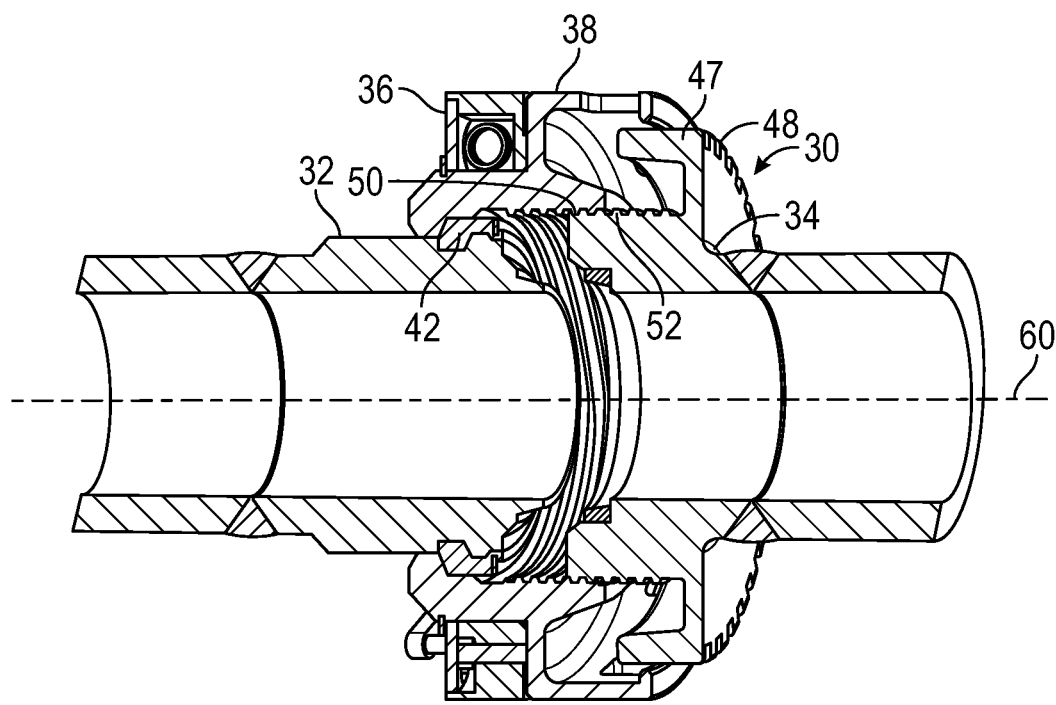
FIG. 12 is a schematic cross-sectional view of the pipe union of FIG. 4 partially coupled together.

FIG. 12 is a schematic cross-sectional view of the pipe union of FIG. 4 partially coupled together. The tubular first portion 32 and the tubular second portion 34 can be brought and close enough proximity to allow the threads 50 of the locknut to engage the threads 52 of the tubular second portion. In some installations, the initial engagement of the threads can be performed by hand rotation of the locknut.

Figure 13:
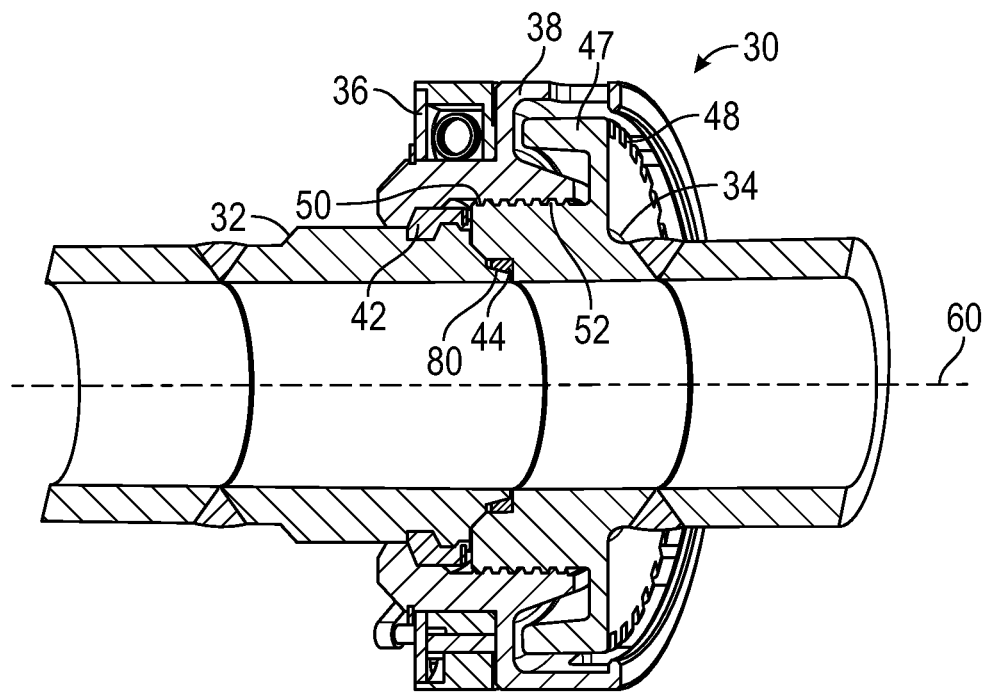
FIG. 13 is a schematic cross-sectional view of the pipe union of FIG. 4 coupled together and ready for tightening.

FIG. 13 is a schematic cross-sectional view of the pipe union of FIG. 4 coupled together and ready for tightening. The threads 50 and 52 can be continued to be tightened together by hand for quick installation until either the tubular first portion contacts the tubular second portion or additional force is needed to continue bringing the first and tubular second portions together.

Figure 14:
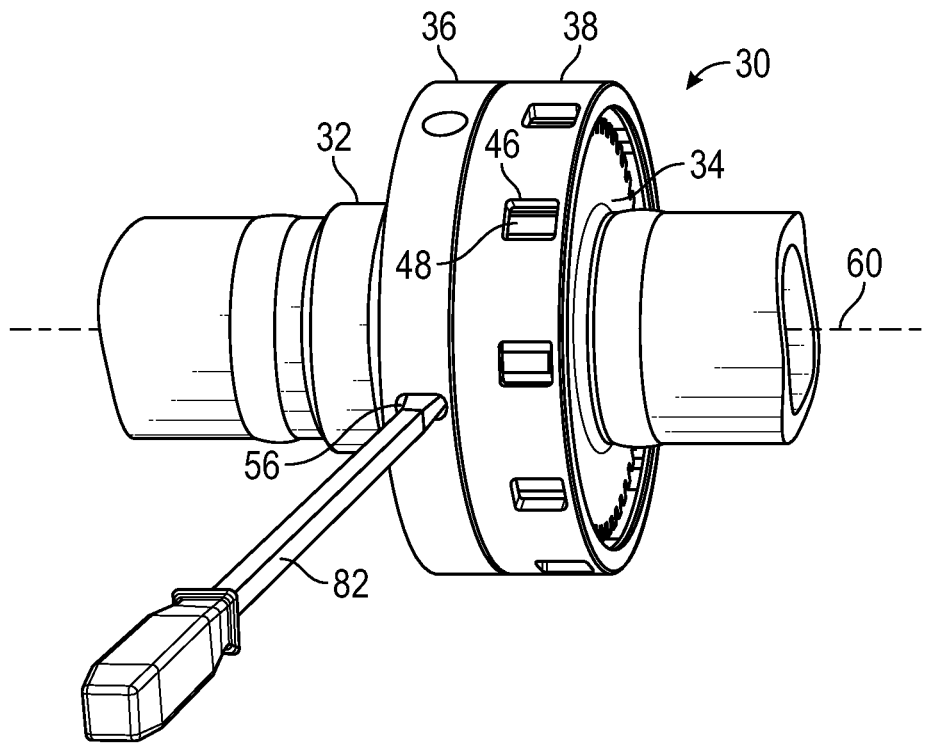
FIG. 14 is a schematic view of the pipe union of FIG. 4 partially tightened using a ratcheting ring.

FIG. 14 is a schematic view of the pipe union of FIG. 4 partially tightened using a ratcheting ring. A tightening tool 82 can be inserted into a ratcheting ring opening 56 for leverage. The leverage can be used to apply additional force to either bring the first and tubular second portions into contact with each other and/or to further tighten the first and tubular second portions together after contacting each other. The ratcheting ring allows an operator to quickly reciprocate the tightening tool through an arc about the longitudinal axis 60 back and forth to progressively pull the first and tubular second portions together and tighten them together without necessarily having to remove and reinsert the tightening tool 82 in each ratcheting ring opening 56 as the ratcheting ring turns. The ratcheting ring progressively grips the locknut when that direction of rotation is resisted by the wedged roller in the cavity, but free wheels in the other direction to release the locknut and allows the ratcheting ring to rotate to a new circumferential position on the locknut before reversing that direction and reengaging the locknut in that position. Thus, each stroke of the tightening tool specifically engages and disengages with the locknut to progressively rotate the locknut to apply additional compression force between the first and tubular second portions.

Figure 15:
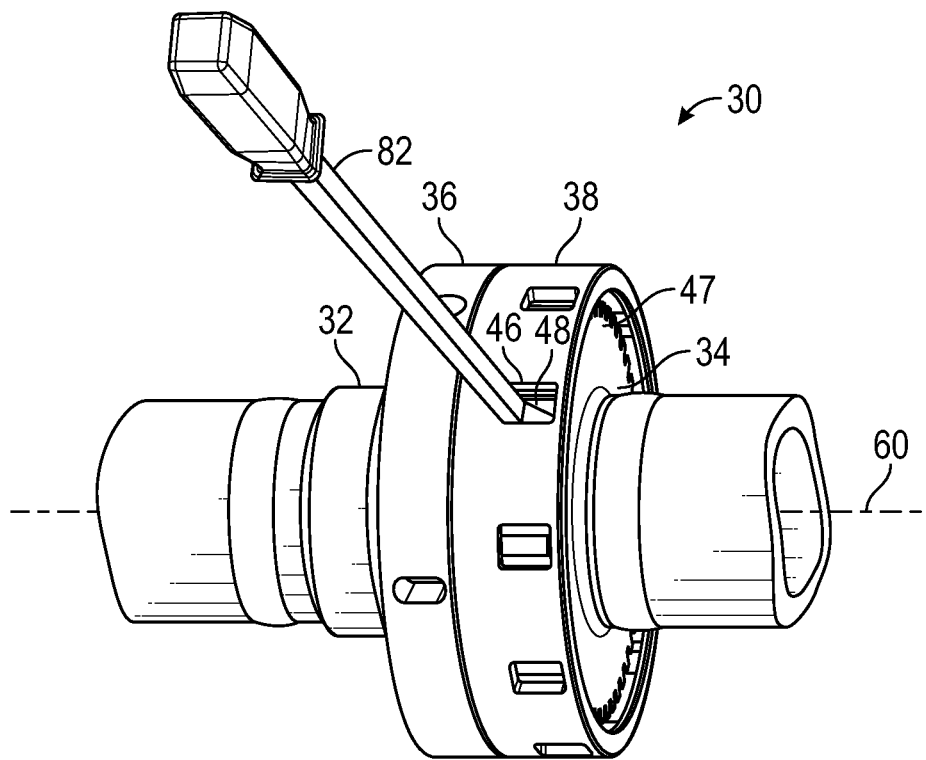
FIG. 15 is a schematic view of the pipe union of FIG. 4 further tightened with mechanical advantage from torque slots.
Figure 16:
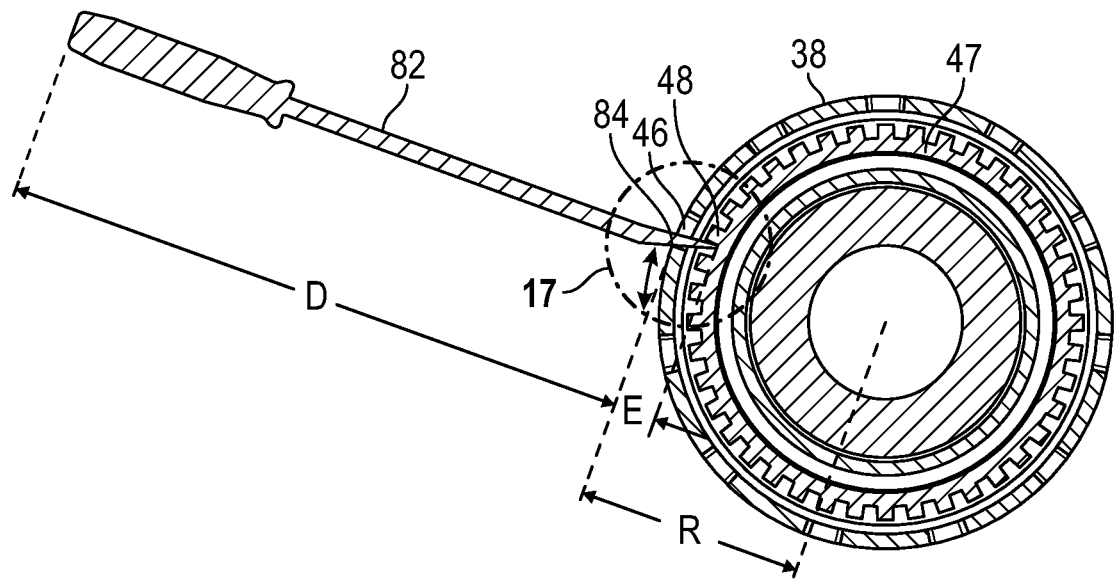
FIG. 16 is a schematic end view of FIG. 15.
Figure 17:
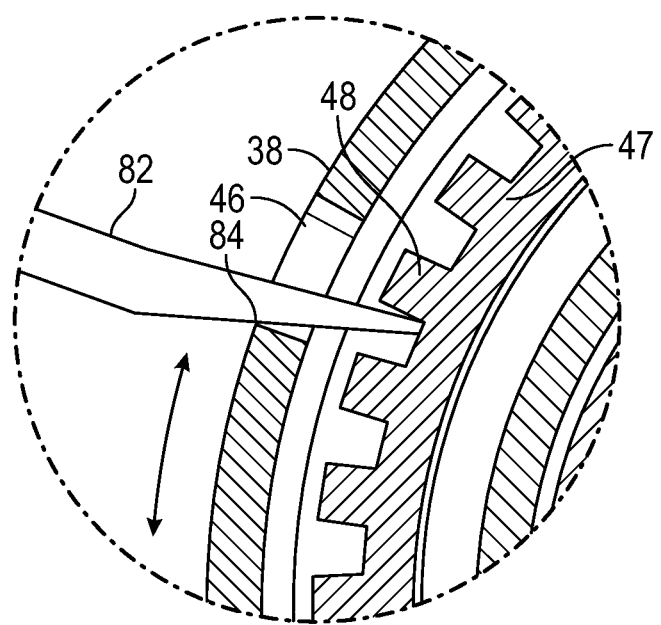
FIG. 17 is a schematic enlarged end view of FIG. 16.

FIG. 15 is a schematic view of the pipe union of FIG. 4 further tightened with mechanical advantage from torque slots. FIG. 16 is a schematic end view of FIG. 15. FIG. 17 is a schematic enlarged end view of FIG. 16. When the force using the ratcheting ring becomes sufficiently large that additional leverage is needed, the tightening tool 82 can be removed from the ratcheting ring opening 56, and inserted through a torque opening 46 to engage a torque slot 48 formed in the torque ring 47 of the tubular second portion 34. While this stage may be somewhat slower than using the ratcheting ring slot 56, additional leverage caused by the greater distance D of the tightening tool 82 from the fulcrum 84 formed in the torque opening 46 compared to the distance E from the fulcrum 84 to the torque slot 48 creates a significant mechanical advantage. An operator can use the mechanical advantage to apply sufficient torque to the locknut 38 as the locknut further rotates around the fixed tubular second portion 34 until the coupling is sufficiently tight for the given operational conditions. As one non-limiting example, if the distance D is 36 inches (91 centimeters "cm") and the distance E is 1 inch (2.5 cm), then a force of 100 pounds-force (445 newtons "N") on the tightening tool will translate into about 3600 pounds-force (16000 N) onto the torque opening 46 to rotate the locknut 38 relative to the torque slots 48 on the torque ring 47 of the tubular second portion. If the locknut outside diameter is 12 inches (30 cm) with a radius R of 6 inches (15 cm), then the torque on the locknut 38 will be about 21,600 inch pounds-force (244000 newton centimeters "N·cm"), that is, 1,800 foot-pounds force (2440 newton meters "N·m").

To dissemble an installed union, the opposite procedure can be used. The tightening tool 82 can be inserted into the torque openings 46 to engage the torque slots 48. The tightening tool 82 can use the mechanical advantage described above as leverage to pry the locknut 38 in an opposite direction to loosen the locknut coupled to the fixed tubular second portion 34. When sufficient looseness allows the ratcheting ring to be used, the tightening tool 82 can be removed from the torque opening 46 and inserted into the ratcheting ring opening 56. The lever 58 can be moved to a second position as described above, so that the ratcheting ring engages and disengages in the opposite direction. Either the tightening tool can reciprocally rotate the ratcheting ring to turn the locknut 38 until the threads 50 and 52 from the first and tubular second portions are threadably disengaged, or at least the locknut can be rotated by hand to cause the first and tubular second portions to disengage.

Figure 18:
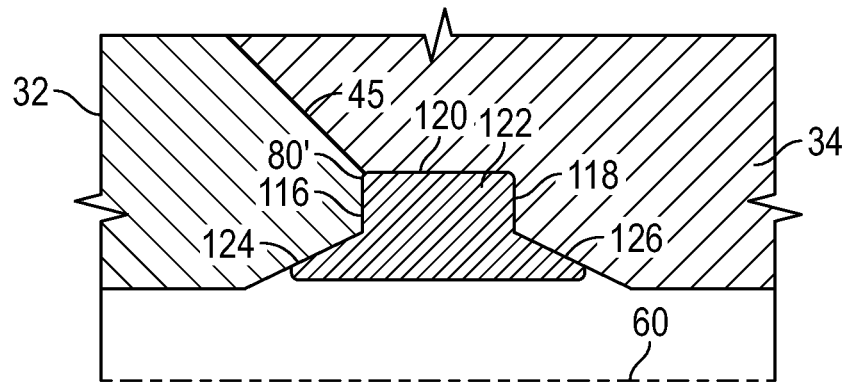
FIG. 18 is a schematic enlarged cross-sectional view of the pipe union of FIG. 4 with an alternative seal.

FIG. 18 is a schematic enlarged cross-sectional view of the pipe union of FIG. 4 with an alternative seal. In some applications, such as high-pressure applications, a metal seal 122 can be used in lieu of or even in addition to the seal 44, shown in FIG. 7. The installation of the tubular first portion 32 with the tubular second portion 34 and compression force on the metal seal 122 can be accomplished in an analogous manner described for the seal 44. The tubular first portion 32 with a shoulder 116 can be brought into contact with the tubular second portion 34 with a shoulder 118 to retain and generally compress the metal seal 122 longitudinally. The metal seal 122 is retained radially by an outer wall 120 shown formed in the tubular second portion 34, although the outer wall could be formed in the tubular first portion 32 or a combination of the tubular first portion and the tubular second portion. A taper 124 can be formed on the tubular first portion radially inward from the shoulder 116. A corresponding taper 126 can be formed on the tubular second portion 34 radially inward from the shoulder 118. The metal seal 122 can be formed with corresponding tapered wing surfaces to engage the tapers 124 and 126. A seal interface 45 can be formed between the tubular first portion and tubular second portion and can be a metal-to-metal seal, as similarly described in FIG. 7. The metal seal 122 can be compressed and energized to seal between the tubular first portion 32 and tubular second portion 34 between the shoulders 116 and 118.

Figure 19:
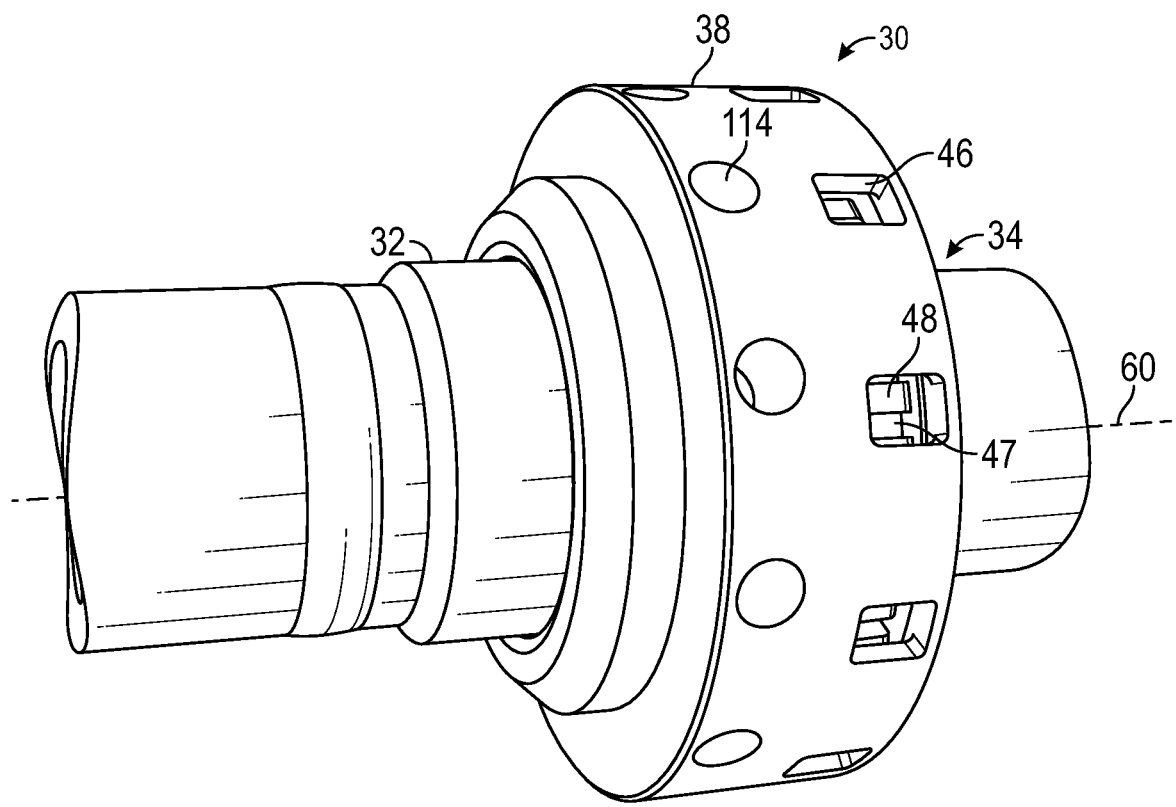
FIG. 19 is a schematic perspective view of another example of a pipe union according to the present invention.

FIG. 19 is a schematic perspective view of another example of a pipe union according to the present invention. The pipe union 30 includes the tubular first portion 32 rotationally longitudinally coupled with a locknut 38 having the torque openings 46, as described above. The union 30 further includes the tubular second portion 34 (partially obscured by the orientation) that includes the torque ring 47 with the torque slots 48. Tightening openings 114 are formed in the locknut 38 in addition to the torque openings 46 in the locknut. The tightening openings 114 can be used to receive a tightening tool to incrementally rotate the locknut around threads on the tubular second portion as incremental openings are used with the tightening rod. Thus, the tightening tool interaction with the tightening openings can rotate the locknut independently of or in lieu of the ratcheting ring described above.

Figure 20:
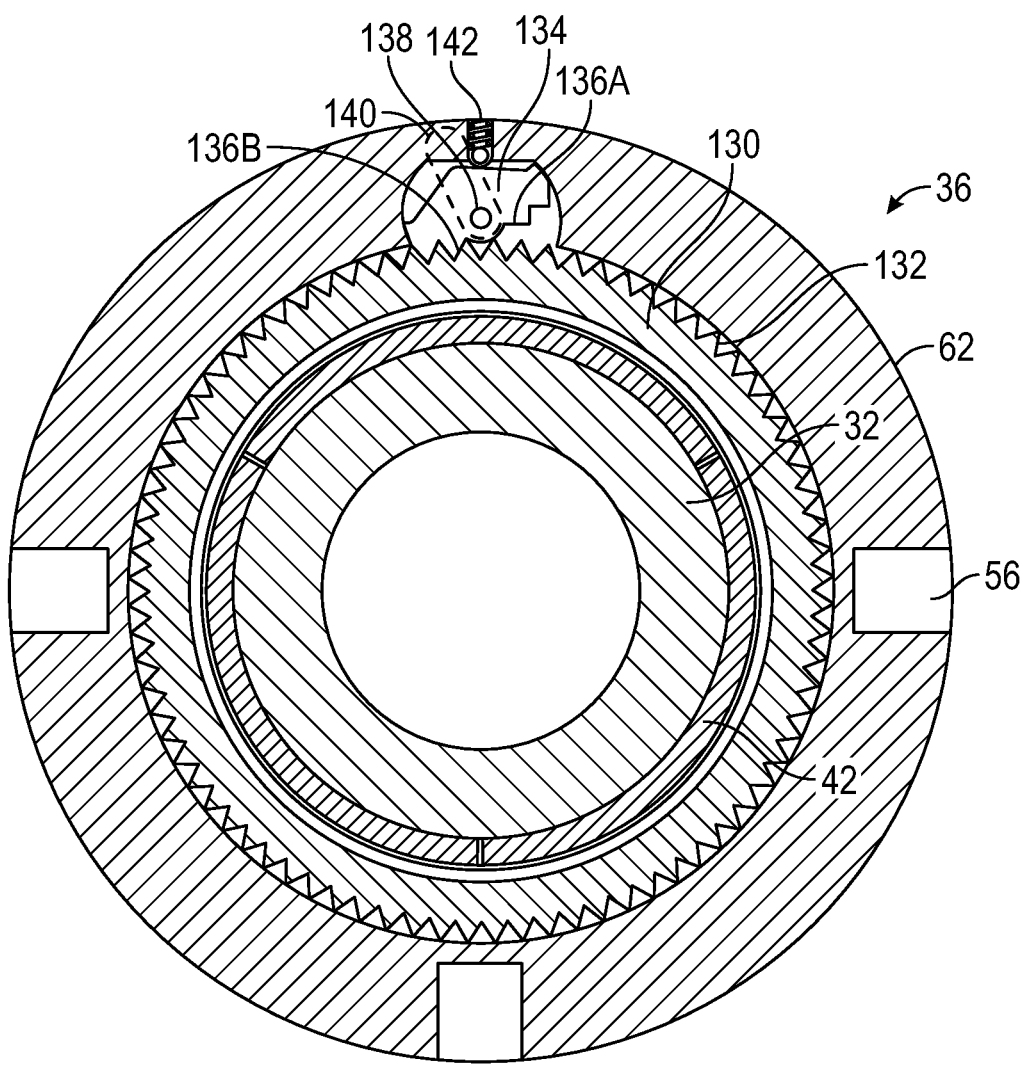
FIG. 20 is schematic cross-sectional view of another example of a pipe union according to the present invention, illustrating an alternative ratcheting ring.

FIG. 20 is schematic cross-sectional view of another example of a pipe union according to the present invention, illustrating an alternative ratcheting ring. The alternative ratcheting ring 36 can be mounted on the tubular first portion 32, as described above. This embodiment of the ratcheting ring can include a ratchet wheel 130 rotatably fixed to the tubular first portion 32. The ratchet wheel 130 has radial teeth 132 extending around the outer periphery. A ratcheting ring housing 62 is rotatably uncoupled to the tubular first portion 32 and can rotate around the ratchet wheel 130. A pawl 134 can be rotatably coupled to the ratcheting ring housing 62. The pawl 132 is formed with mating pawl teeth 136 that can engage the ratchet wheel teeth 132. The pawl 136 can be pivotally coupled with a pin 138 to the ratcheting ring housing 62, so that the pawl teeth 136A on a first portion of the pawl can engage the ratchet wheel teeth 132 on one side of the pin 138, while the pawl teeth 1366 on a section portion of the pawl disengages the ratchet wheel teeth 132 on the other side of the pin 138 and vice versa. Engagement of the pawl teeth 136A can allow the ratchet ring housing 62 to rotate one direction (first direction) and not the opposite direction (second direction), while engagement of the pawl teeth 136B can allow the ratchet ring housing to rotate in the second direction and not the first direction. A switch 140 can move the pawl between engagements and disengagements of the respective sides of the pawl teeth. The pawl can be biased into one position or the other for relative engagements of the pawl teeth by a bias element 142.

Figure 21:
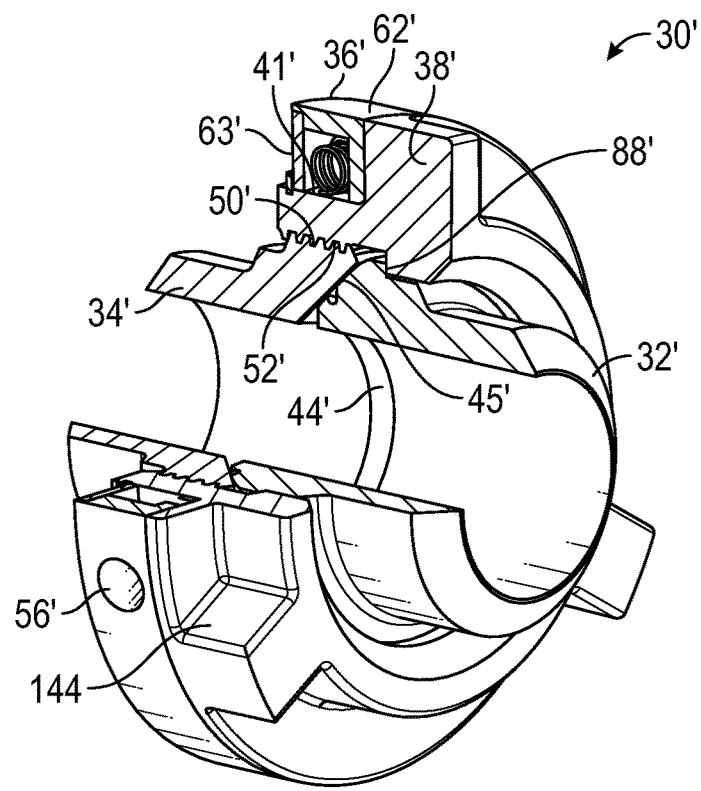
FIG. 21 is a schematic partial cross-sectional view of another example of a pipe union according to the present invention.
Figure 22:
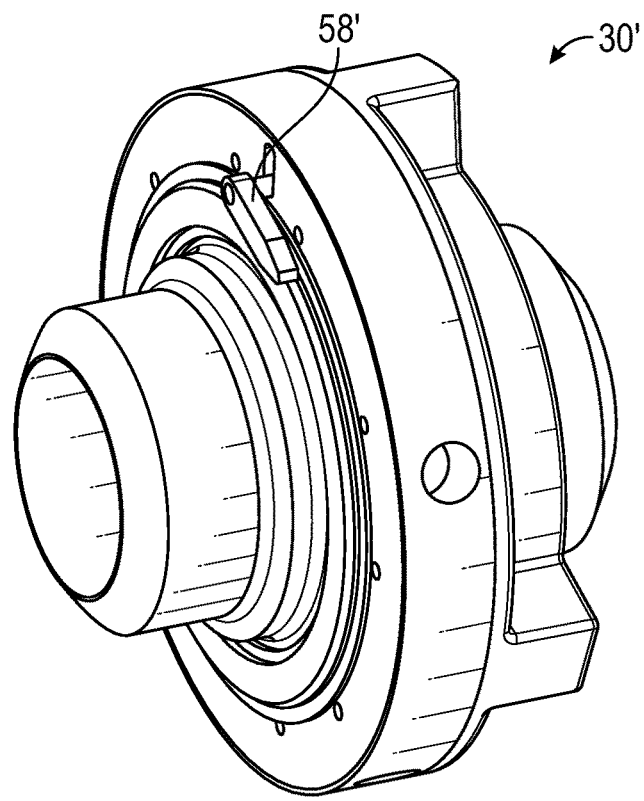
FIG. 22 is a schematic perspective view of an opposite end of the pipe union shown in FIG. 21.

FIG. 21 is a schematic partial cross-sectional view of another example of a pipe union according to the present invention. FIG. 22 is a schematic perspective view of an opposite end of the pipe union shown in FIG. 21. The pipe union 30' includes a tubular first portion 32' that can be sealingly coupled with a tubular second portion 34'. A locknut 38' is longitudinally coupled to the tubular first portion 32', such as by a shoulder on the tubular first portion at an interface 88' that limits longitudinal movement of the locknut in the direction of the tubular second portion 34'. However, the locknut 38' can be rotationally uncoupled from the tubular first portion 32' to rotate around the tubular first portion and threadably engage with locknut threads 50' corresponding threads 52' on the tubular second portion 34'. When tightened, such as by rotating the locknut around the threads, the tubular second portion is brought into sealing engagement with the tubular first portion. A ratcheting ring 36' can assist an operator in rotating the locknut 38' around the threads 52' of the tubular second portion 34' for such engagement. The ratcheting ring 36' can be mounted on a locknut mounting surface 41' of the locknut 38'. The ratcheting ring 36' can include a one-way clutch mechanism, such as described above, that grips the locknut mounting surface 41' when rotated in one direction, but releases the surface when rotated in the opposite direction. Thus, an operator can reciprocally rotate the ratcheting ring 36' to progressively turn the locknut 38' to tighten the tubular second portion with the tubular first portion. (Alternatively, when loosening the locknut from the tubular second portion, the opposite sequence of rotation can occur by changing the ratcheting ring switch 58.) A ratcheting ring opening 56' can be used by an operator to insert a bar or other tool to generally reciprocally rotate the ratcheting ring with mechanical advantage. In at least one embodiment, the ratcheting ring 36' can include a ratchet ring housing 62' with a keeper plate 63' in which various clutch components, such as described above, including bias elements, rollers, slots, and retaining pins, or a ratchet wheel and pawl, and other elements and features described above can be used. A seal 44' can be used to seal between the tubular first portion 32' and the tubular second portion 34'. Additionally, a metal-to-metal seal interface 45' can provide additional sealing capabilities. When tightened with the ratchet ring 36, an operator can make final tightening torque (or initial loosening torque) by hitting or otherwise impacting a lug 144 on the locknut 38'.

Other and further embodiments utilizing one or more aspects of the inventions described above can be devised without departing from the disclosed invention as defined in the claims. For example, various shapes of the device, fasteners used with the device, sizes, materials, angles, clips, along with other variations can occur in keeping within the scope of the claims, and other variations.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A pipe union assembly, comprising:
   a tubular first portion having a bore;
   a tubular second portion having a bore and coupled with a torque ring, the torque ring having torque slots; and
   a locknut having an inner diameter greater than an outer diameter of the tubular first portion and configured to slide longitudinally over the tubular first portion, the locknut being longitudinally restrained in a direction toward the tubular second portion when the tubular second portion is facing the tubular first portion, the locknut being configured to engage the tubular second portion and rotate relative to the tubular second portion to pull the second portion closer to the first portion, the locknut having openings formed through at least a portion of the locknut, the openings being configured to align with the torque slots to allow a tool inserted into the opening to engage the torque slots and apply leverage to the locknut from the engagement to turn the locknut around the tubular second portion and pull the tubular second portion into sealing engagement with the tubular first portion.

2. The pipe union assembly of claim 1, further comprising a ratcheting ring longitudinally coupled to the locknut and rotatably coupled to the locknut in one direction and rotatably uncoupled to the locknut in an opposite direction.

3. The pipe union assembly of claim 2, wherein the ratcheting ring comprises a one-way friction clutch.

4. The pipe union assembly of claim 3, wherein the one-way friction clutch comprises a ratcheting ring housing cavity having a progressively narrower radial width toward each end of the cavity compared to a radial width of a center portion of the cavity between each end;
   a first roller and a second roller disposed in the cavity having a diameter greater than the radial width of the ends of the cavity and less than the radial width of the center portion of the cavity;
   a bias element disposed between the roller and configured to bias the rollers toward the ends of the cavity; and
   a ratcheting ring switch configured to bias one roller toward the center portion of the cavity and allow the other roller to move toward one end of the cavity.

5. The pipe union assembly of claim 2, wherein the ratcheting ring comprises a ratchet wheel having radial ratchet teeth and a pawl having radial pawl teeth on first portion rotatably engageable with the ratchet wheel for rotation in one direction and a second portion rotatably engagement with the ratchet wheel for rotation in an opposition direction.

6. The pipe union assembly of claim 2, further comprising at least one radial ratcheting ring opening formed in an external surface of the ratcheting ring.

7. The pipe union assembly of claim 1, further comprising a seal cavity formed at an interface between the tubular first portion and the tubular second portion.

8. The pipe union assembly of claim 7, further comprising a self-energizing seal disposed in the seal cavity, the seal cavity formed with clearance fluidicly open to pressure from the bore of at least one of the tubular first portion and the tubular second portion, the seal cavity further formed with a decreasing cross section distal from the clearance into the seal cavity.

9. The pipe union assembly of claim 1, further comprising tightening openings formed in the locknut.

10. A pipe union assembly, comprising:
    a tubular first portion having retaining segments circumferentially disposed around a periphery of the tubular first portion;
    a tubular second portion coupled with a torque ring, the torque ring being aligned transverse to a longitudinal axis of the tubular second portion and having torque slots aligned longitudinally, the tubular second portion having threads on a portion of the tubular second portion; and
    a locknut having an inner diameter greater than an outer diameter of the tubular first portion and configured to slide longitudinally over the tubular first portion, the locknut being longitudinally restrained by the retaining segments in a direction toward the tubular second portion when the tubular second portion is facing the tubular first portion, the locknut having mating threads configured to engage the tubular second portion threads and rotate relative to the tubular second portion to threadably pull the second portion closer to the first portion, the locknut having openings formed through a portion of the locknut radially outward from the torque slots, the openings being configured to align with the torque slots to allow a tool inserted into the opening to engage the torque slots and apply leverage to the locknut from the engagement to rotatably tighten the locknut around the tubular second portion and pull the tubular second portion into sealing engagement with the tubular first portion.

11. The pipe union assembly of claim 10, further comprising a ratcheting ring longitudinally coupled to the locknut and rotatably coupled to the locknut in one direction and rotatably uncoupled to the locknut in an opposite direction.

12. The pipe union assembly of claim 11, wherein the ratcheting ring comprises a one-way friction clutch.

13. The pipe union assembly of claim 11, wherein the ratcheting ring comprises a ratchet wheel having radial ratchet teeth and a pawl having radial pawl teeth on first portion rotatably engageable with the ratchet wheel for rotation in one direction and a second portion rotatably engagement with the ratchet wheel for rotation in an opposition direction.

14. A method of tightening a pipe union having a tubular first portion, a locknut rotatably uncoupled and longitudinally coupled to the tubular first portion and having radial holes, and a tubular second portion having radial slots, comprising:
  engaging threads on the locknut with threads on the tubular second portion;
  rotating the locknut relative to the tubular second portion to partially tighten the tubular first portion with the tubular second portion and at least partially longitudinally align the radial holes with the radial slots; and
  further tightening the tubular first portion with the tubular second portion using mechanical advantage by rotating the radial holes relative to the radial slots.

15. The method of claim 14, further comprising ratcheting the locknut on the tubular first portion by selectively engaging the locknut circumferentially in one direction and not in an opposition direction to turn the locknut when engaged.

\* \* \* \* \*